US010696148B2

(12) United States Patent
Taketomo (10) Patent No.: US 10,696,148 B2
(45) Date of Patent: Jun. 30, 2020

(54) CONFIGURATION OF AUTOMOBILE GLASS RUN

(71) Applicant: NISHIKAWA RUBBER CO., LTD., Hiroshima-shi, Hiroshima (JP)

(72) Inventor: Shinsuke Taketomo, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 181 days.

(21) Appl. No.: 15/984,366

(22) Filed: May 20, 2018

(65) Prior Publication Data
US 2018/0339582 A1    Nov. 29, 2018

(30) Foreign Application Priority Data

May 23, 2017    (JP) ................................. 2017-101715

(51) Int. Cl.
| *B60J 10/76* | (2016.01) |
| *B60J 10/21* | (2016.01) |
| *B60J 10/30* | (2016.01) |

(52) U.S. Cl.
CPC ............... *B60J 10/76* (2016.02); *B60J 10/21* (2016.02); *B60J 10/30* (2016.02)

(58) Field of Classification Search
CPC ............. B60J 10/76; B60J 10/78; B60J 10/30
See application file for complete search history.

(56) References Cited

U.S. PATENT DOCUMENTS

| 2004/0010976 A1* | 1/2004 | Langemann | B60J 10/18 49/493.1 |
| 2005/0053761 A1* | 3/2005 | Murase | B60R 21/205 428/122 |
| 2005/0136199 A1* | 6/2005 | Aoki | B60J 10/16 428/34.1 |
| 2006/0000148 A1* | 1/2006 | Mugishima | B60J 10/24 49/475.1 |
| 2007/0175102 A1* | 8/2007 | Teramoto | B60J 10/30 49/441 |
| 2007/0296250 A1* | 12/2007 | Yatsuda | B60J 10/30 296/201 |
| 2010/0199568 A1* | 8/2010 | Kondo | B60J 10/36 49/441 |
| 2012/0023831 A1* | 2/2012 | Matsumoto | B60J 10/24 49/489.1 |

(Continued)

FOREIGN PATENT DOCUMENTS

| DE | 4320330 A1 * | 10/1994 | ............. B60J 10/30 |
| JP | H07-266888 A | 10/1995 | |
| JP | 2002240571 A * | 8/2002 | ............. B60J 10/30 |

(Continued)

*Primary Examiner* — Marcus Menezes
(74) *Attorney, Agent, or Firm* — Renner, Otto, Boisselle & Sklar, LLP (57) ABSTRACT

The present disclosure reduces the displacement or fall of a glass run caused by temperature changes. A rivet 40 penetrates a planar opposing portion 10 of a sash and a planar mounting portion 22 of a trim strip in a thickness direction to fasten the planar opposing portion 10 and the planar mounting portion 22 together in the thickness direction. A base 31 of a glass run 30 is provided with an engagement protrusion 36 arranged adjacent in a lengthwise direction of an automobile to a swaged portion 42 of the rivet 40.

4 Claims, 4 Drawing Sheets

(56) References Cited

U.S. PATENT DOCUMENTS

2012/0124779 A1\* 5/2012 Nameki ................. B29C 48/12
                                                                    16/96 R
2018/0229590 A1\* 8/2018 Bito ........................ B60J 10/30

FOREIGN PATENT DOCUMENTS

| JP | 2002337550 A | \* 11/2002 | ............... B60J 10/30 |
|----|--------------|------------|---------------------------|
| JP | 2007-091172 A | 4/2007 | |
| JP | 4423604 B2 | 12/2009 | |
| JP | 4888187 B2 | 12/2011 | |

\* cited by examiner

OUTSIDE OF CABIN ← → INSIDE OF CABIN

CONFIGURATION OF AUTOMOBILE GLASS RUN

BACKGROUND

The present disclosure relates to a configuration of a glass run attached to a sash of an automobile door. In particular, the disclosure relates to a configuration which reduces the possibility of displacement or fall of the glass run from the sash.

BACKGROUND ART

A generally known automobile door includes a door glass which is movable up and down, and a sash holding a peripheral edge of the door glass. The sash guides the peripheral edge of the door glass. A glass run is attached to the sash to seal a gap between the door glass and the sash.

For example, Japanese Patent No. 4423604 discloses a door of this type. In this door, a bracket provided with a notch is welded to a sash, and a protrusion provided for a bottom wall of a glass run is fitted in the notch of the bracket. According to Japanese Unexamined Patent Publication No. H07-266888, a threaded part is provided for a glass run in advance, and a screw inserted in a hole formed through a planar portion of a sash is screwed into the threaded part of the glass run, thereby fastening the glass run to the sash. According to Japanese Unexamined Patent Publication No. 2007-91172, an engagement member inserted in a hole of a sash protrudes from the sash toward a glass run. The glass run is provided with a glass run stopper protruding from a bottom wall of the glass run. The glass run stopper has an engagement surface facing an engagement surface of the engagement member. Japanese Patent No. 4888187 discloses a configuration in which a sash is provided with a hole or a recess, and a glass run is provided with a restricting protrusion fitted in the hole or the recess.

SUMMARY

Technical Problem

In general, the sash is made of metal, and the glass run is made of resin. Thus, the sash and the glass run have different linear expansion coefficients. Specifically, the glass run has a larger linear expansion coefficient than the sash. Automobiles are supposed to be used under different temperature conditions, e.g., at low temperature in cold climate areas, or high temperature in the hot sun in summer, and thus, experience large temperature variations. If the glass run has a larger linear expansion coefficient than the sash, the sash shrinks less than the glass run at low temperature. That is, the glass run and the sash shrink differently. Therefore, the glass run may be displaced from the sash, or in a worst scenario, the glass run may fall off the sash.

To cope with such a problem, as disclosed by Japanese Patent No. 4423604, for example, a bracket provided with a notch can be welded to the sash so that a protrusion provided for a bottom wall of the glass run is fitted in the notch of the bracket. This configuration may reduce the possibility of displacement or fall of the glass run caused by the temperature change. However, preparation of the bracket increases the number of parts, and the welding of the bracket increases the number of steps. Further, as disclosed by Japanese Unexamined Patent Publication No. H07-266888, if the screw inserted in the sash is screwed into the threaded part of the glass run, the possibility of displacement or fall of the glass run caused by the temperature change may be reduced. However, this configuration requires the screw and the step of fitting the screw in the threaded part, which increases the number of parts and the number of steps. Further, as disclosed by Japanese Unexamined Patent Publication No. 2007-91172, if an engagement member of the sash is engaged with a glass run stopper of the glass run, the possibility of displacement or fall of the glass run caused by the temperature change may be reduced. However, this configuration requires the engagement member and the step of attaching the engagement member, which increases the number of parts and the number of steps.

Further, the engagement member is not made of metal, but of resin. Thus, the fastening of the engagement member to the hole of the sash may become loose, which may cause unwanted noise.

As a possible solution to such a problem, for example, Japanese Patent No. 4888187 discloses a restricting protrusion of the glass run fitted in a hole or recess of the sash. This may reduce the possibility of displacement or fall of the glass run caused by the temperature change without increasing the number of parts. However, such a configuration requires an additional step of providing the sash with the hole or the recess, which increases the number of steps, and the sash itself may become less rigid. Therefore, the configuration of Japanese Patent No. 4888187 cannot be applied in some cases.

In view of the foregoing, the present inventor has focused on a configuration in which a rivet is used to fasten a trim strip to the sash. It is therefore an object of the present disclosure to reduce the possibility of displacement or fall of the glass run from the sash caused by the temperature change by making use of the rivet, without using an additional part such as a bracket.

Solution to the Problem

To achieve the object, according to the present disclosure, an engagement protrusion provided for a glass run is allowed to engage with an end of a rivet for fastening a trim strip to a sash.

A first aspect of the disclosure is directed to a configuration of a glass run attached to a sash, of a door of an automobile, to which a trim strip is fastened with a rivet, the glass run sealing a gap between the sash and a door glass held by the sash, wherein the glass run comprises a base, an inner sidewall extending from an inner end of the base located inside of a cabin, an outer sidewall extending from an outer end of the base located outside the cabin, an inner seal lip extending from the inner sidewall toward an inner surface of the door glass facing inside of the cabin to come into contact with the inner surface, and an outer seal lip extending from the outer sidewall toward an outer surface of the door glass facing outside of the cabin to come into contact with the outer surface, a planar opposing portion of the sash facing the base of the glass run is stacked on a planar mounting portion of the trim strip in a thickness direction, the rivet penetrates the planar opposing portion of the sash and the planar mounting portion of the trim strip in the thickness direction, with both ends thereof protruding from a stack of the planar opposing portion and the planar mounting portion, so as to fasten the planar opposing portion and the planar mounting portion together in the thickness direction, and the base is provided with an engagement protrusion arranged adjacent in a lengthwise direction of the automobile to the end of the rivet protruding toward the base.

In this aspect, with the glass run attached to the sash, the base of the glass run faces the planar opposing portion of the sash. The planar mounting portion of the trim strip is stacked on the planar opposing portion of the sash, and the rivet penetrating these portions fastens the trim strip to the sash. One of the ends of the rivet protrudes toward the base, and the engagement protrusion of the glass run is arranged adjacent in the lengthwise direction of the automobile to the end of the rivet. Thus, for example, when the glass run further shrinks than the sash through a temperature decrease from a room temperature to a temperature below zero, the engagement protrusion of the glass run engages with the end of the rivet. This can reduce the possibility of displacement or fall of the glass run from the sash.

According to the present disclosure, the end of the rivet which fastens the trim strip to the sash can be used to reduce the possibility of displacement or fall of the glass run. Thus, unlike Japanese Patent No. 4423604, and Japanese Unexamined Patent Publications Nos. H07-266888 and 2007-91172, an additional member for reducing the displacement of the glass run is no longer necessary, which does not increase the number of parts and steps.

Since the trim strip is fastened to the sash with the rivet, the sash hardly loses its rigidity. This can avoid the decrease in the rigidity of the sash caused by providing the hole or the recess with the sash as disclosed by Japanese Patent No. 4888187.

According to a second aspect of the disclosure, the engagement protrusion has an engagement surface facing the end of the rivet in the lengthwise direction of the automobile, and the engagement surface has a larger dimension in a widthwise direction of the automobile than the end of the rivet.

In this aspect, when the temperature changes, the engagement surface of the engagement protrusion comes into contact, and engage, with the end of the rivet. The engagement surface has a larger dimension in the widthwise direction of the automobile than the end of the rivet. Thus, even if the engagement protrusion and the end of the rivet are slightly misaligned with each other in the widthwise direction, the end of the rivet and the engagement surface of the engagement protrusion reliably come into contact with each other.

According to a third aspect of the present disclosure, the engagement surface has a recessed portion on which the end of the rivet fits.

In this aspect, when the temperature changes, the end of the rivet fits onto the recessed portion of the engagement protrusion to bring the rivet and the engagement protrusion into engagement. In this engagement, relative displacement between the end of the rivet and the engagement protrusion in the widthwise direction of the automobile can be reduced. As a result, the engagement protrusion is not easily detached from the end of the rivet.

According to a fourth aspect of the present disclosure, the planar mounting portion of the trim strip is arranged on a surface of the planar opposing portion of the sash opposite to the base, and the engagement protrusion has a protruding end face arranged to abut on the planar opposing portion of the sash.

In this aspect, when the door glass is closed and the base of the glass run is pressed by an end of the door glass, the end face of the engagement protrusion of the base comes into contact with the planar opposing portion of the sash. That is, the engagement protrusion can be used as a seat on which the closed door glass abuts.

According to a fifth aspect of the present disclosure, the glass run has a corner portion at its end in the lengthwise direction, the corner portion being a die-molded portion.

In this aspect, the engagement protrusion can be formed integrally and simultaneously with the die-molded portion. Since the die-molded portion is provided at the end of the glass run in the lengthwise direction, the engagement protrusion is also provided at the end of the glass run in the lengthwise direction. Thus, the rivet can position the end of the glass run in the lengthwise direction. This can further reduce the possibility of displacement or fall of the glass run.

Advantages of the Invention

According to the first aspect of the present disclosure, the engagement protrusion is provided at the base of the glass run to be adjacent in the lengthwise direction to the end of the rivet which fastens the trim strip to the sash. This can reduce the possibility of displacement or fall of the glass run from the sash caused by the temperature change, without providing an additional part, or reducing the rigidity of the sash.

According to the second aspect of the present disclosure, the engagement surface of the engagement protrusion has a larger dimension in the widthwise direction than the end of the rivet. Thus, the end of the rivet and the engagement surface of the engagement protrusion can reliably engage with each other when the temperature changes.

According to the third aspect of the present disclosure, the engagement surface of the engagement protrusion has a recessed surface. Thus, relative displacement between the end of the rivet and the engagement protrusion in an engaged state can be reduced, and the engagement protrusion does not easily become detached from the end of the rivet.

According to the fourth aspect of the present disclosure, the end face of the engagement protrusion is arranged to abut on the planar opposing portion of the sash. Thus, the engagement protrusion can be used as a seat on which the door glass abuts.

According to a fifth aspect of the present disclosure, the engagement protrusion can be integrally formed with the die-molded portion serving as the corner portion provided at the end of the glass run in the lengthwise direction. The rivet can position the end of the glass run in the lengthwise direction. This can further reduce the possibility of displacement or fall of the glass run.

DETAILED DESCRIPTION

Embodiments of the present disclosure will be described in detail with reference to the drawings. The following description of advantageous embodiments is only an example in nature, and is not intended to limit the scope, applications, or use of the present disclosure.

Figure 1:
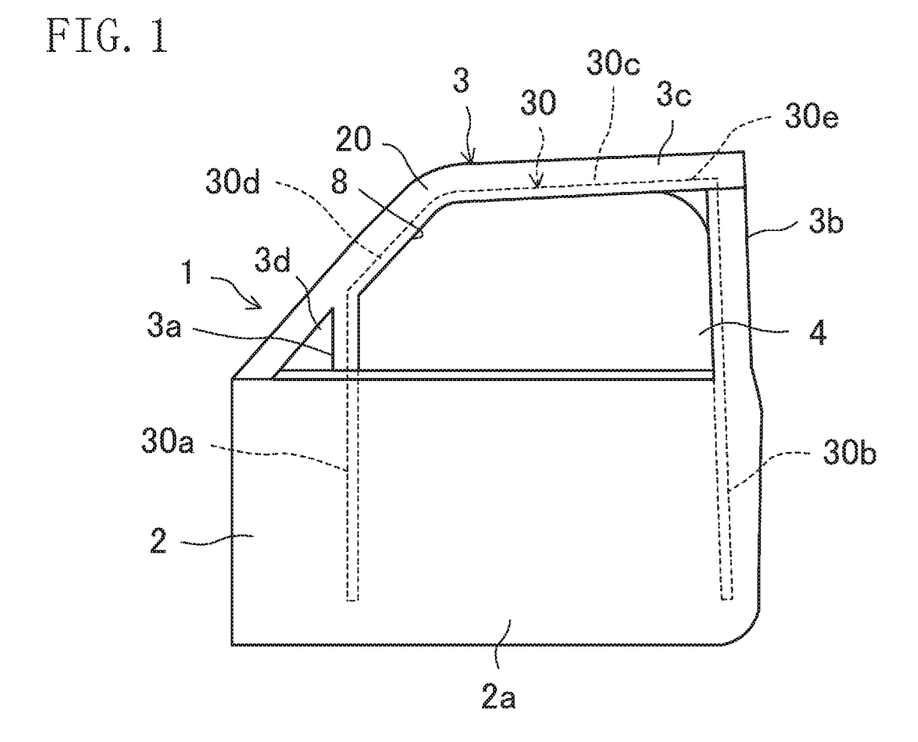
FIG. 1 is a left side view of a door to which an automobile glass run according to an embodiment has been applied.

FIG. 1 is a side view (left side view) as seen from the outside of a cabin, illustrating a door 1 of an automobile, to which a configuration of a glass run according to a first embodiment of the present disclosure has been applied. The door 1 is a left front door arranged near the front of the automobile (not shown) on the left side of the automobile, and covers or uncovers an opening (not shown) formed through the left front side of the automobile near the front of the automobile. Although not shown, if a rear door is arranged on each side of the automobile, the present disclosure is also applicable to a glass run attached to the rear door. Although not shown, the present disclosure is also applicable to a glass run attached to the right door.

In the description of this embodiment, the side closer to the front of the vehicle is simply referred to as "front," and the side closer to the rear of the vehicle is simply referred to as "rear." They are merely used for easy description, and do not limit the present disclosure.

The door 1 includes a door body 2 comprising almost lower half of the door 1, and a sash 3 comprising almost upper half of the door 1. Although not shown, a front end of the door body 2 is attached to a pillar of an automobile body via hinges pivoting about an axis extending in a vertical direction. The door body 2 includes an inner panel (not shown) and an outer panel 2a which are made of steel sheets or any other suitable material, and is configured to house a door glass 4 which is movable up and down, and a lifting apparatus (not shown) which allows the door glass 4 to move up and down.

Figure 6:
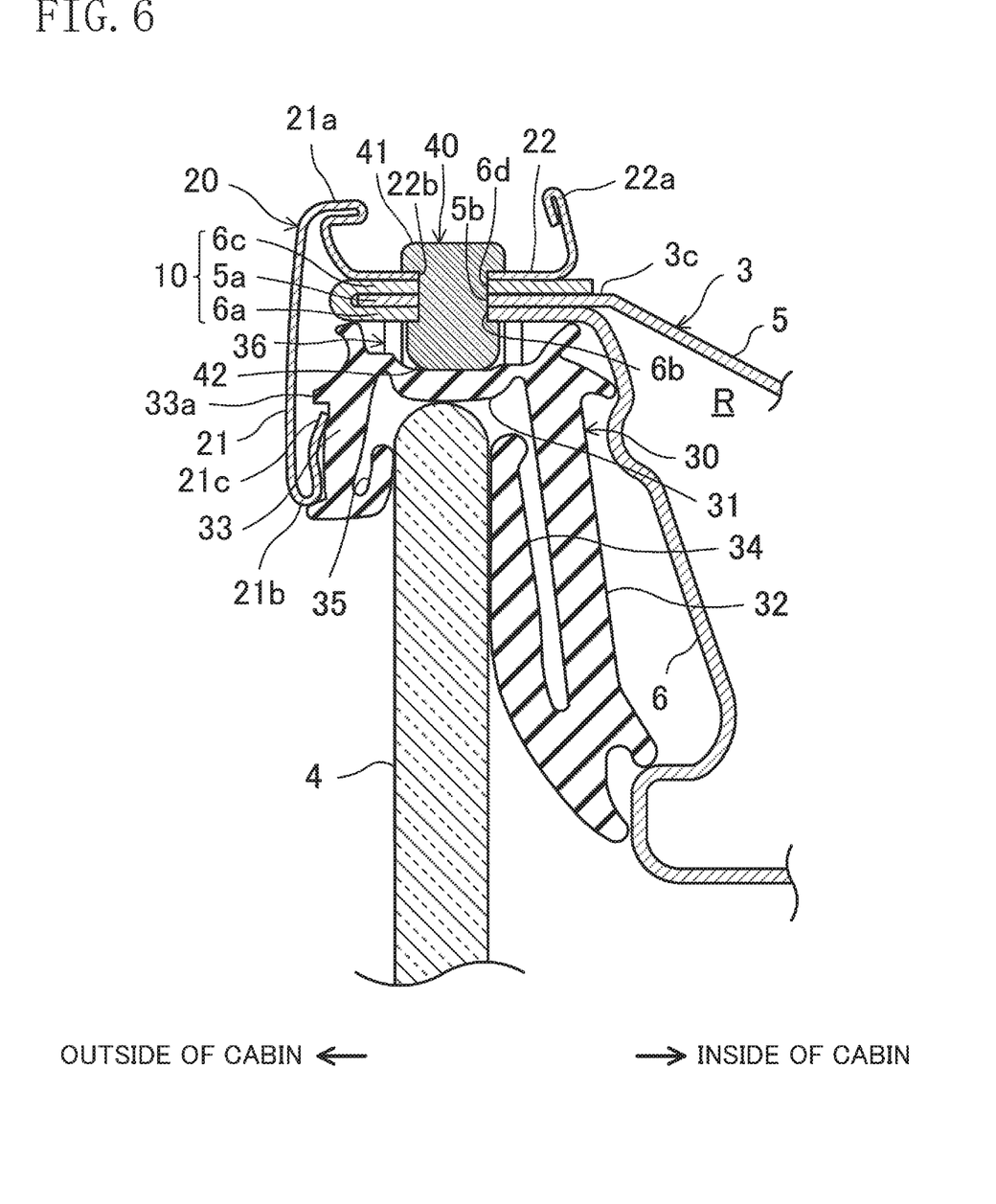
FIG. 6 is a cross-sectional view illustrating the glass run taken along line VI-VI of FIG. 3, together with a sash, a trim strip, and a door glass.

The sash 3 may be called a window frame, and holds a peripheral portion of the door glass 4. The sash 3 extends to define a window opening 8 (shown in FIG. 1 only). The door glass 4 is configured to cover or uncover the window opening 8 defined by the sash 3. The sash 3 of this embodiment is formed by, for example, roll forming, as shown in FIG. 6. The sash 3 may be comprised of a combination of two plate members, each of which is press-formed from a steel sheet or any other suitable material, for example.

As shown in FIG. 1, the sash 3 is comprised of a front frame portion 3a, a rear frame portion 3b, and an upper frame portion 3c. The front frame portion 3a protrudes upward from a front portion of an upper edge of the door body 2. The rear frame portion 3b extends upward from a rear portion of the upper edge of the door body 2. The rear frame portion 3b extends to be taller than the front frame portion 3a. The upper frame portion 3c extends in a lengthwise direction of the automobile (will be hereinafter simply referred to as the "lengthwise direction") from an upper end of the front frame portion 3a to an upper end of the rear frame portion 3b along a side edge of a roof (not shown) of the automobile body. The shape of the upper frame portion 3c is not limited to the illustrated one. Alternatively, the upper frame portion 3c may be entirely curved upward, or may have a curved portion suitably positioned, or an inclination angle suitably determined, in association with the roof shape of the automobile body.

A door mirror mount 3d to which a door mirror (not shown) is attached is provided forward of the front frame portion 3a of the sash 3. The door mirror mount 3d has an upper edge portion continuous with the front end portion of the upper frame portion 3c of the sash 3.

As shown in FIG. 6, the sash 3 is provided with a planar opposing portion 10 which is arranged to oppose a base 31 of a glass run 30 to be described later. A first planar portion 5 which constitutes a part of the sash 3 has, at an upper end thereof, a first top planar portion 5a protruding toward the outside of the cabin and extending in the lengthwise direction from a front end to rear end of the upper frame portion 3c. A second planar portion 6 which constitutes a part of the sash 3 has, at an upper end thereof, a second top planar portion 6a protruding toward the outside of the cabin along a lower surface of the first top planar portion 5a and extending in the lengthwise direction from the front end to rear end of the upper frame portion 3c. The second top planar portion 6a is bent at approximately 180 degrees (i.e., hemmed) outside the cabin to form a third top planar portion 6c further extending toward the inside of the cabin. The first, second, and third top planar portions 5a, 6a, and 6c are stacked and joined together in the thickness direction (vertical direction). The first, second, and third top planar portions 5a, 6a, and 6c constitute the planar opposing portion 10. The front frame portion 3a and the rear frame portion 3b may be configured in the same manner. The first and second planar portions 5 and 6 forming the sash 3 define a hollow portion R inside the sash 3.

The first top planar portion 5a of the first planar portion 5 has a first rivet hole 5b in which a rivet 40 to be described later is inserted. The second top planar portion 6a of the second planar portion 6 has a second rivet hole 6b aligned with the first rivet hole 5b.

The third top planar portion 6c of the second planar portion 6 has a third rivet hole 6d aligned with the first rivet hole 5b.

(Configuration of Trim Strip)

As shown in FIGS. 1 and 6, the door 1 has a trim strip 20. The trim strip 20 extends in the lengthwise direction along the upper frame portion 3c of the sash 3. The trim strip 20 may be made of a metallic material such as stainless steel, and aluminum die-cast, or a hard resin material. The trim strip 20 includes a planar vertical portion 21 and a planar mounting portion 22, which are molded in one piece. The planar vertical portion 21 is provided to add some spice to the design of the door 1. Thus, in one preferred embodiment, an outer surface of the planar vertical portion 21 facing the outside of the cabin is made of metal or plated with metal.

As shown in FIG. 6, the planar vertical portion 21 is arranged to face the outside of the cabin, and extends substantially in the vertical direction and continuously from the front end to rear end of the upper frame portion 3c of the sash 3. An upper end of the planar vertical portion 21 is bent toward the inside of the cabin to form an upper protrusion 21a. A lower end of the planar vertical portion 21 is bent toward the inside of the cabin to form a lower protrusion 21b. An upper end of the lower protrusion 21b serves as an end of the trim strip 20. The lower protrusion 21b protrudes less toward the inside of the cabin from the planar vertical portion 21 than the upper protrusion 21a protruding from the planar vertical portion 21. The upper and lower protrusions 21a and 21b also extend continuously from the front end to rear end of the upper frame portion 3c of the sash 3.

The planar mounting portion 22 protrudes toward the inside of the cabin from the portion which is between the upper protrusion 21a and an intermediate protrusion 21c on the inner side of the vertical planar portion 21, and continuously extends from the front end to rear end of the upper frame portion 3c of the sash 3. The planar mounting portion 22 is stacked on the planar opposing portion 10 of the upper frame portion 3c in the thickness direction (vertical direction). The planar mounting portion 22 extends along the planar opposing portion 10. A lower surface of the planar mounting portion 22 is in contact with an upper surface of the third top planar portion 6c of the second planar portion 6 of the planar opposing portion 10. Thus, the first top planar portion 5a of the first planar portion 5, the second and third top planar portions 6a and 6c of the second planar portion 6, and the planar mounting portion 22 are stacked one above the other.

An end of the planar mounting portion 22 located inside of the cabin forms an upper side portion 22a protruding upward and extending continuously from the front end to rear end of the upper frame portion 3c of the sash 3. The upper side portion 22a is inclined such that the more it protrudes upward, the further toward the outside it is located. An upper end thereof is bent at approximately 180 degrees toward the outside of the cabin.

The planar mounting portion 22 has a fourth rivet hole 22b in which a rivet 40 to be described later is inserted. The fourth rivet hole 22b is aligned with the first, second, and third rivet holes 5b, 6b, and 6d. The first, second, third, and fourth rivet holes 5b, 6b, 6d, and 22b may have the same diameter.

(Configuration of Rivet)

As shown in FIG. 6, the rivet 40 penetrates the planar opposing portion 10 of the sash 3 and the planar mounting portion 22 of the trim strip 20 in the thickness direction, with both ends thereof protruding from the stack of the planar opposing portion and the planar mounting portion, thereby fastening the planar opposing portion 10 and the planar mounting portion 22 together in the thickness direction. The rivet 40 may be made of, for example, an aluminum alloy.

Specifically, the rivet 40 is inserted in the first, second, and third rivet holes 5b, 6b, and 6d of the planar opposing portion 10 of the sash 3, and the fourth rivet hole 22b of the trim strip 20, to penetrate the planar opposing portion 10 and the planar mounting portion 22 in the thickness direction. The rivet 40 has a head 41 at an upper end thereof. The head 41 protrudes upward from the upper surface of the planar mounting portion 22. The head 41 has a larger diameter than the fourth rivet hole 22b of the trim strip 20. A peripheral portion of the head 41 comes into contact, and engages, with the upper surface of the planar mounting portion 22 from above.

The rivet 40 has a swaged portion 42 at a lower end thereof. The swaged portion 42 has a shape similar to that of the head 41, and is in the form of a vertically extending column. The swaged portion 42 protrudes downward from the lower surface of the planar opposing portion 10 of the sash 3. The swaged portion 42 has a larger diameter than the second rivet hole 6b. A peripheral portion of the swaged portion 42 comes into contact, and engages, with the lower surface of the second planar portion 6 from below. The head 41 and swaged portion 42 of the rivet 40 sandwich and integrate the first planar portion 5, the second planar portion 6 which has been bent and folded, and the planar mounting portion 22 in the vertical direction.

The swaged portion 42 is swaged by a swaging tool (not shown) into a shape with a larger diameter than the second rivet hole 6b. Before the swaging, the tail of the rivet 40, which will be the swaged portion 42, is narrow, and has a smaller diameter than the second rivet hole 6b. Specifically, the narrow tail is allowed to pass through the first, second, third, and fourth rivet holes 5b, 6b, 6d, and 22b, and then vertically pressed for plastic deformation. Thus, the swaged portion 42 is obtained. The shape of the swaged portion 42 is not limited to the one shown in the drawings.

(Configuration of Glass Run)

The glass run 30 functions as a sealing member which seals a gap between the sash 3 and the door glass 4 held by the sash 3. As shown in FIG. 6, the glass run 30 is assembled to the sash 3 for use. The glass run 30 may be made of an elastic material, such as ethylene-propylene-diene rubber (EPDM), or olefin-based thermoplastic elastomer (TPO). The EPDM or TPO may be a foamed material, or a solid material.

As shown in FIG. 1, the glass run 30 includes a front glass run 30a vertically extending along the upper frame portion 3a of the sash 3, a rear glass run 30b vertically extending along the rear frame portion 3b of the sash 3, and an upper glass run 30c extending in the lengthwise direction along the upper frame portion 3c of the sash 3. The glass run 30 also includes a front corner portion 30d at its front end (a front end in the lengthwise direction) and a rear corner portion 30e at its rear end (a rear end in the lengthwise direction). The front corner portion 30d connects the upper end of the front glass run 30a and the front end of the upper glass run 30c. The rear corner portion 30e connects the upper end of the rear glass run 30b and the rear end of the upper glass run 30c.

Figure 2:
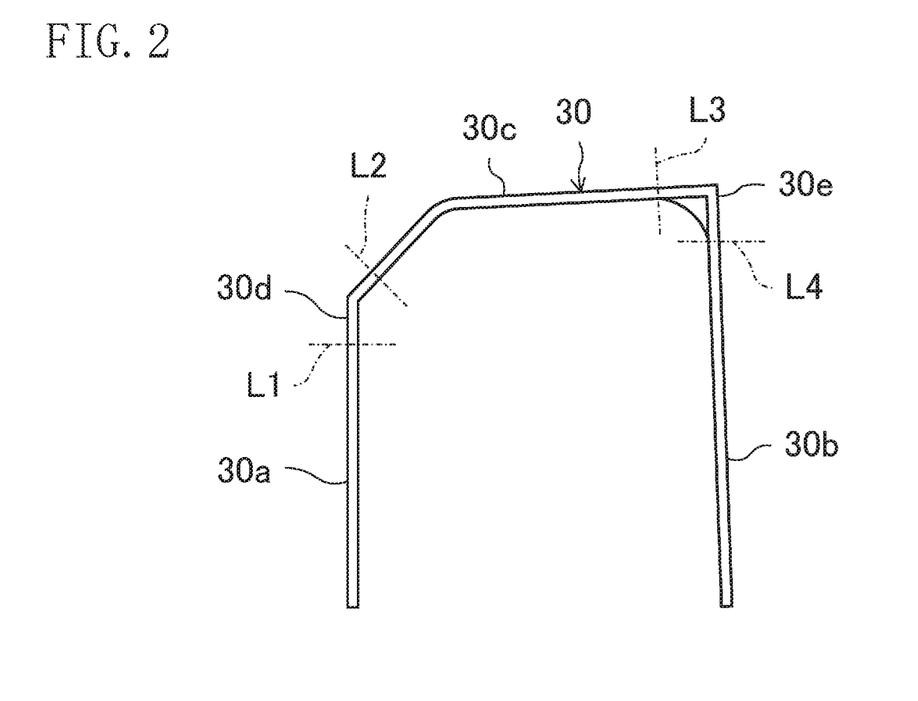
FIG. 2 is a left side view of the glass run.
Figure 3:
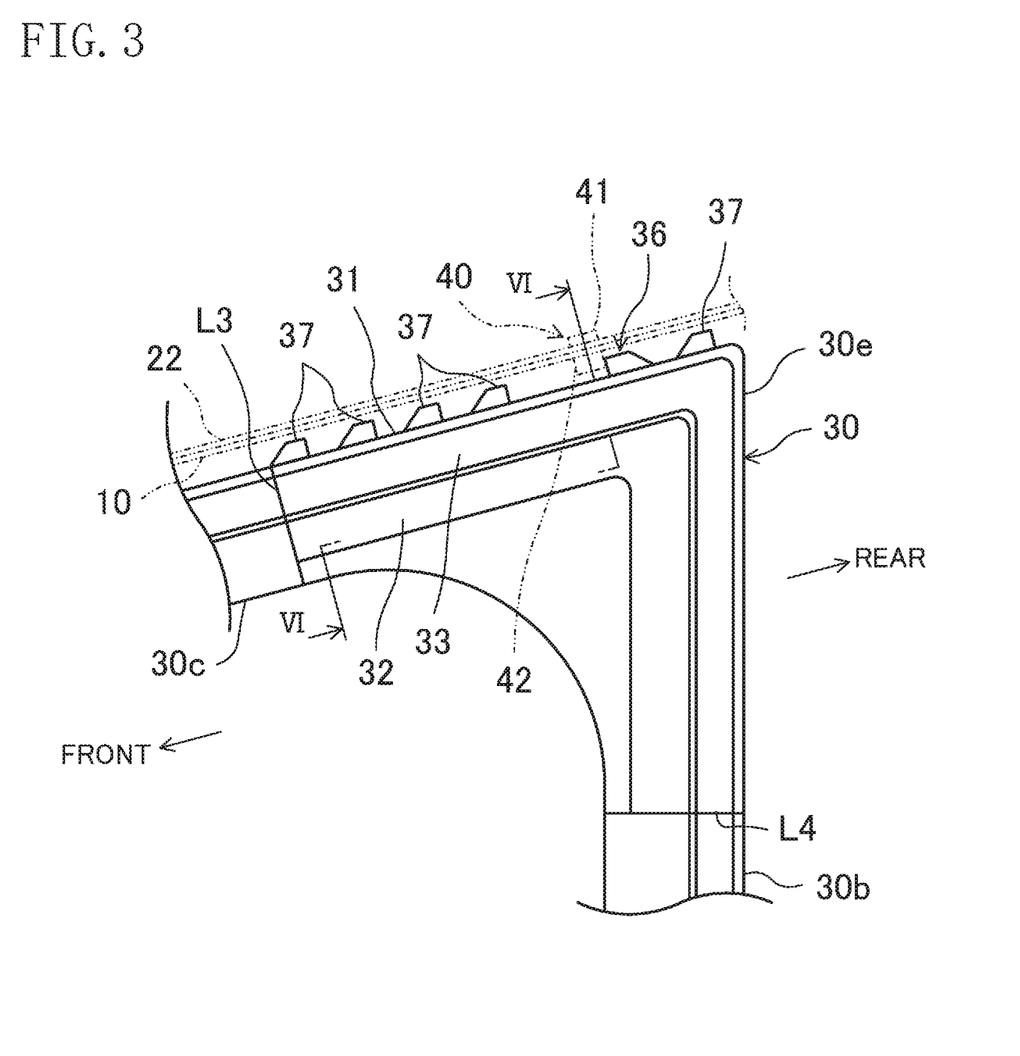
FIG. 3 shows a corner portion of the glass run and its vicinity as viewed from outside of a cabin.
Figure 4:
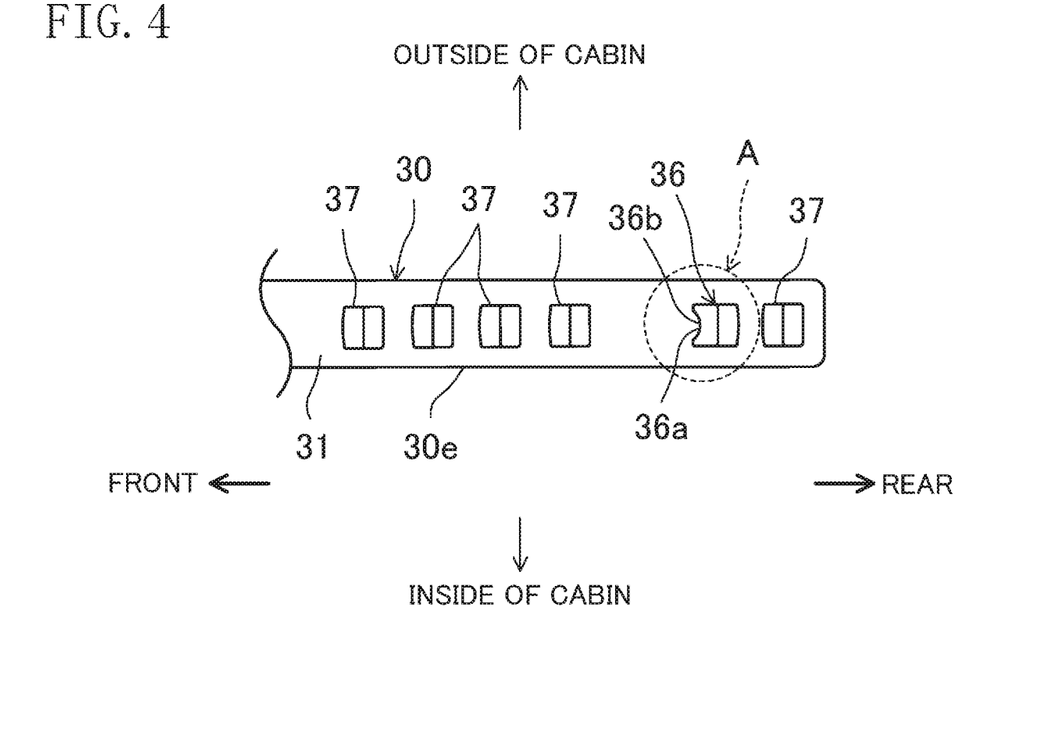
FIG. 4 shows the corner portion of the glass run and its vicinity as viewed from above.

As shown in FIG. 2, the front corner portion 30d lies between boundary lines L1 and L2. The rear corner portion 30e lies between boundary lines L3 and L4. FIG. 3 shows the rear corner portion 30e and its vicinity. The front and rear corner portions 30d and 30e of the glass run 30 are die-molded portions. The die-molded portion is a portion molded with a molding die which opens and closes. Basically, a material is injected into, or injection-molded in, a pair of dies in a closed state, and then the dies are opened to remove the molded material. Other portion of the glass run 30 than the front and rear corner portions 30d and 30e is an extrusion-molded portion. The extrusion-molded portion is formed by extruding a material from a die head, and has the same cross section when viewed in the longitudinal direction.

As shown in FIG. 6, the glass run 30 includes a base 31, an inner sidewall 32 extending from an inner end of the base 31 located inside the cabin, an outer sidewall 33 extending from an outer end of the base 31 located outside the cabin, an inner seal lip 34 extending from the inner sidewall 32 toward an inner surface of the door glass 4 to come into contact with the inner surface, and an outer seal lip 35 extending from the outer sidewall 33 toward an outer surface of the door glass 4 to come into contact with the outer surface.

The base 31 is arranged to face the lower surface of the planar opposing portion 10 of the sash 3, and extends along the lower surface of the planar opposing portion 10. The inner sidewall 32 extends further downward than the lower end of the outer sidewall 33. The inner seal lip 34 extends obliquely upward from the lower end of the inner sidewall 32 toward the outside of the cabin. The outer seal lip 35 extends obliquely upward from the lower end of the outer sidewall 33 toward the inside of the cabin.

An outer surface of the outer sidewall 33 facing outside the cabin is covered with the vertical planar portion 21 of the trim strip 20. The vertical planar portion 21 of the trim strip 20 extends further upward than the upper end of the outer sidewall 33. The outer surface of the outer sidewall 33 is provided with a recess 33a in which the intermediate protrusion 21c of the vertical planar portion 21 of the trim strip 20 fits.

Figure 5:
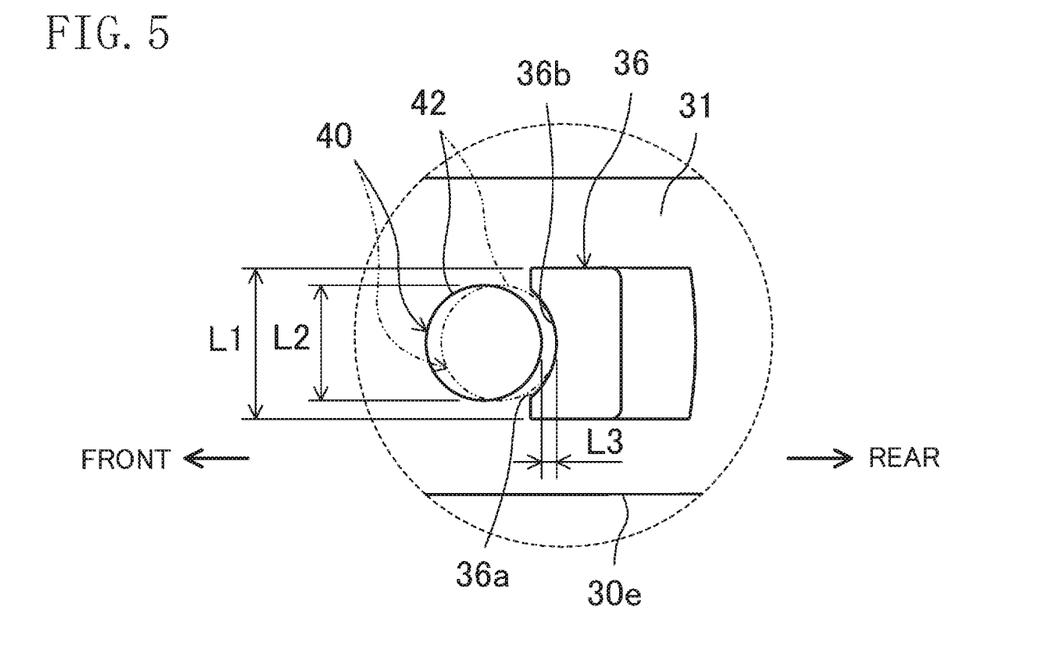
FIG. 5 shows part A of FIG. 4 in an enlarged scale, illustrating a positional relationship between the glass run attached to a sash and a rivet.

As shown in FIGS. 3 and 5, the base 31 has an engagement protrusion 36 which protrudes upward, and is arranged adjacent in the lengthwise direction to the end of the rivet 40 protruding toward the base 31, i.e., the swaged portion 42. In addition to the engagement protrusion 36, the base 31 also has a plurality of protrusions 37 protruding upward. The engagement protrusion 36 and the protrusions 37 are integrally molded with the rear corner portion 30e.

The engagement protrusion 36 has an engagement surface 36a facing the swaged portion 42 of the rivet 40 in the lengthwise direction. Specifically, the engagement surface 36a faces the rear side of the swaged portion 42. As shown in FIG. 5, the length L1 of the engagement surface 36a in the widthwise direction of the automobile (will be hereinafter simply referred to as the "widthwise direction") is greater than the length L2 (diameter) of the swaged portion 42 of the rivet 40 in the widthwise direction. The engagement surface 36a has a recessed portion 36b shaped to fit on the swaged portion 42 of the rivet 40. The recessed portion 36b is open toward the front. The recessed portion 36b may be an arc-shaped surface having a curvature equal to or greater than that of the peripheral surface of the swaged portion 42 of the rivet 40. The recessed portion 36b is not limited to the arc-shaped surface, and may be any surface as long as it is curved.

As shown in FIG. 5, the recessed portion 36b is positioned such that a gap is formed between the recessed portion 36b of the engagement protrusion 36 and the peripheral surface of the swaged portion 42 of the rivet 40 when the sash 3 and the glass run 30 are at room temperature (e.g., 20° C.). The gap between the peripheral surface of the swaged portion 42 of the rivet 40 and the recessed portion 36b of the engagement protrusion 36 has a dimension L3 of 0.5 mm to 2 mm, for example, at room temperature. However, this is not limiting, and the dimension may be determined as appropriate depending on the lengths of the upper frame portion 3c of the sash 3 and the upper glass run 30c of the glass run 30, or the materials of the sash 3 and the glass run 30 (difference between linear expansion coefficients).

In one preferred embodiment, the dimension L3 may be determined such that the peripheral surface of the swaged portion 42 of the rivet 40 is in contact, and engages, with the recessed portion 36b of the engagement protrusion 36 at low temperature. The low temperature is, for example, a temperature below zero. When the sash 3 and the glass run 30 are cooled to a temperature below zero, they shrink as a whole. At this time, the upper frame portion 3c of the sash 3 and the upper glass run 30c of the glass run 30 are long, and thus, they shrink significantly. The sash 3 is made of metal (e.g., a steel sheet), while the glass run 30 is made of resin or any other suitable material. Therefore, the sash 3 and the glass run 30 have different linear expansion coefficients. Specifically, the sash 3 has a smaller linear expansion coefficient than the glass run 30. Thus, the glass run 30 further shrinks in the lengthwise direction than the sash 3 when cooled from a room temperature to a temperature below zero. Therefore, the dimension L3 is determined such that the recessed portion 36b of the engagement protrusion 36 approaches the peripheral surface of the swaged portion 42 of the rivet 40 to come into contact, and engage, with the peripheral surface of the swaged portion 42 when the temperature falls below zero.

As shown in FIG. 6, the planar mounting portion 22 of the trim strip 20 is arranged on the surface of the planar opposing portion 10 of the sash 3 opposite to the base 31, i.e., the upper surface. The engagement protrusion 36 has a protruding end face (upper end face) which comes into contact with the planar opposing portion 10 of the sash 3. The upper end face of the engagement protrusion 36 extends along the lower surface of the planar opposing portion 10 of the sash 3.

Advantages of Embodiment

As can be seen in the foregoing, according to the configuration of the automobile glass run of this embodiment, the base 31 of the glass run 30, which is attached to the sash 3, faces the planar opposing portion 10 of the sash 3. The planar mounting portion 22 of the trim strip 20 is stacked on the planar opposing portion 10 of the sash 3, and the rivet 40 penetrating the portions 22 and 10 fastens the trim strip 20 to the sash 3. The swaged portion 42 of the rivet 40 protrudes toward the base 31, and thus, the engagement protrusion 36 of the glass run 30 is arranged adjacent in the lengthwise direction to the swaged portion 42. Specifically, when the glass run 30 further shrinks than the sash 3 through a temperature decrease from a room temperature to a temperature below zero, the engagement protrusion 36 of the glass run 30 engages with the swaged portion 42 of the rivet 40. This can reduce the possibility of displacement or fall of the glass run 30 from the sash 3.

In this embodiment, the swaged portion 42 of the rivet 40 which fastens the trim strip 20 to the sash 3 can be used to reduce the possibility of displacement or fall of the glass run 30. Thus, an additional member for reducing the possibility of displacement of the glass run 30 is no longer necessary, which does not increase the number of parts and steps. Since the trim strip 20 is fastened to the sash 3 with the rivet 40, the sash 3 hardly loses its rigidity.

Further, the engagement surface 36a of the engagement protrusion 36 has a larger dimension in the widthwise direction than the swaged portion 42 of the rivet 40. Thus, even if the engagement protrusion 36 and the swaged portion 42 of the rivet 40 are slightly misaligned with each other in the widthwise direction, the swaged portion 42 of the rivet 40 and the engagement surface 36a of the engagement protrusion 36 reliably come into contact, and engage, with each other.

Moreover, the swaged portion 42 of the rivet 40 fits on the recessed portion 36b of the engagement protrusion 36 to achieve engagement between them. This engagement can reduce relative displacement between the swaged portion 42 of the rivet 40 and the engagement protrusion 36 in the widthwise direction. As a result, the engagement protrusion 36 is not easily detached from the swaged portion 42 of the rivet 40.

When the door glass 4 is closed and the base 31 of the glass run 30 is pressed by an end of the door glass 4, the end face of the engagement protrusion 36 of the base 31 comes into contact with the planar opposing portion 10 of the sash 3.

That is, the engagement protrusion 36 can be used as a seat on which the closed door glass 4 abuts.

To attach the glass run 30 to the sash 3, the engagement protrusion 36 is engaged with the swaged portion 42 of the rivet 40. Thus, the glass run 30 can be positioned relative to the sash 3.

OTHER EMBODIMENTS

The embodiment described above is a mere example in every respect, and shall not be interpreted in a limited manner. Any modification and change equivalent to the scope of claims fall within the scope of the present disclosure.

It has been described in the above embodiment that the swaged portion 42 of the rivet 40 is formed at a lower end of the rivet 40. However, this configuration is not limiting, and the swaged portion may be provided at an upper end of the rivet 40, and the head may be provided at a lower end of the rivet 40.

INDUSTRIAL APPLICABILITY

As can be seen in the foregoing, the present disclosure is applicable to the case where, for example, a glass run is attached to a sash of an automotive door.

The invention claimed is:

1. A configuration of a glass run attached to a sash, of a door of an automobile having a cabin, to which a trim strip that is formed of a different member from the sash is fastened with a rivet, the glass run sealing a gap between the sash and a door glass held by the sash, wherein
   the glass run comprises a base, an inner sidewall extending from an inner end of the base located inside of the cabin, an outer sidewall extending from an outer end of the base located outside the cabin, an inner seal lip extending from the inner sidewall toward an inner surface of the door glass facing inside of the cabin to come into contact with the inner surface, and an outer seal lip extending from the outer sidewall toward an outer surface of the door glass facing outside of the cabin to come into contact with the outer surface,
   the trim strip includes a planar mounting portion facing the base of the glass run, the planar mounting portion being stacked in a thickness direction on a planar opposing portion of the sash, the trim strip further including a planar vertical portion extending substantially in a vertical direction and continuously from an end of the planar mounting portion facing the outside of the cabin,
   at least an outer surface of the planar vertical portion is made of metal or plated with a metal,
   the rivet penetrates the planar opposing portion of the sash and the planar mounting portion of the trim strip in the thickness direction, with first and second ends of the rivet both protruding from a stack of the planar opposing portion and the planar mounting portion, so as to fasten the planar opposing portion and the planar mounting portion together in the thickness direction, and
   the base is provided with an engagement protrusion having an engagement surface arranged adjacent in a lengthwise direction of the automobile to the second end of the rivet protruding toward the base,
   the engagement surface has a recessed portion on which the second end of the rivet fits, and
   the recessed portion is an arc-shaped surface having a curvature equal to or greater than that of a peripheral surface of the second end rivet.

2. The configuration of claim 1, wherein
   the engagement surface has a larger dimension in a widthwise direction of the automobile than the second end of the rivet.

3. The configuration of claim 1, wherein
   the planar mounting portion of the trim strip is arranged on a surface of the planar opposing portion of the sash opposite to the base, and
   the engagement protrusion has a protruding end face arranged to abut on the planar opposing portion of the sash.

4. The configuration of claim 1, wherein
   the glass run has a corner portion at an end of the glass run in the lengthwise direction, the corner portion being a die-molded portion, and
   the engagement protrusion is formed in the die-molded portion.

* * * * *